(12) United States Patent
Gao (10) Patent No.: US 11,683,148 B2
(45) Date of Patent: Jun. 20, 2023

(54) METHOD AND RECEIVING DEVICE FOR CLOCK FREQUENCY SYNCHRONIZATION (71) Applicant: SHENZHEN LENKENG TECHNOLOGY CO., LTD, Shenzhen (CN)

(72) Inventor: Binghai Gao, Shenzhen (CN)

(73) Assignee: SHENZHEN LENKENG TECHNOLOGY CO., LTD, Shenzhen (CN)

(*) Notice: Subject to any disclaimer, the term of this patent is extended or adjusted under 35 U.S.C. 154(b) by 88 days.

(21) Appl. No.: 17/361,346

(22) Filed: Jun. 29, 2021

(65) Prior Publication Data
US 2022/0069971 A1 Mar. 3, 2022

(30) Foreign Application Priority Data
Sep. 2, 2020 (CN) .......................... 202010910250.4

(51) Int. Cl.
H04J 3/06 (2006.01)
H04L 7/00 (2006.01)
H04L 69/164 (2022.01)

(52) U.S. Cl.
CPC .......... *H04L 7/0008* (2013.01); *H04L 69/164* (2013.01)

(58) Field of Classification Search
CPC ....... H04L 7/00; H04L 7/0008; H04L 7/0016; H04L 7/0054; H04L 7/027; H04L 7/033;
(Continued)

(56) References Cited

U.S. PATENT DOCUMENTS 7,940,805 B2 * 5/2011 Ichikawa .............. H04L 43/106
370/503
9,967,086 B2 * 5/2018 Su ........................... H03D 3/06
(Continued)

FOREIGN PATENT DOCUMENTS

WO WO 2012/106910 * 8/2012

OTHER PUBLICATIONS

Google English Translation of WO2012106910, 9 pages, translated on Nov. 2, 2022.*

Primary Examiner — Frank Duong
(74) Attorney, Agent, or Firm — Sayramoglu Law Offices LLC (57) ABSTRACT Disclosed are a method and a receiving device for clock frequency synchronization. The method includes the following. A user datagram protocol (UDP) packet is obtained by a receiving device. A value of the data volume of the UDP packet in the cache and a first value are performed, by the receiving device, an operation to obtain the absolute value of the difference between the value of the data volume and the first value. When the absolute value is greater than the preset threshold, a clock frequency of the crystal oscillator in the receiving device is adjusted to obtain a target clock frequency, where after the clock frequency of the crystal oscillator is adjusted, the absolute value of the difference is less than or equal to the preset threshold. The receiving device maintains clock frequency synchronization between the receiving device and the transmitting device based on the target clock frequency.

17 Claims, 2 Drawing Sheets (58) Field of Classification Search
CPC . H04L 12/413; H04L 27/2655; H04L 69/164; H04N 21/4305; H04J 3/0632; H04J 3/0638; H04J 3/0658; H04J 3/0682; H04J 3/07; H04J 2011/0096; H04J 2013/0096
See application file for complete search history.

(56) References Cited

U.S. PATENT DOCUMENTS

| | | | |
|---|---|---|---|
| 2002/0186681 A1* | 12/2002 | Martin | H04J 3/0632 370/350 |
| 2011/0006818 A1* | 1/2011 | Takagi | H04J 3/0664 327/147 |
| 2012/0176201 A1* | 7/2012 | Ganesh | H03L 7/085 331/17 |
| 2021/0243242 A1* | 8/2021 | Ho | H04L 65/80 |

* cited by examiner

METHOD AND RECEIVING DEVICE FOR CLOCK FREQUENCY SYNCHRONIZATION

CROSS REFERENCE TO RELATED APPLICATION

The present application claims priority to Chinese Patent Application Serial No. 202010910250.4 on Sep. 2, 2020, the disclosures of which is herein by incorporated by reference.

TECHNICAL FIELD

The disclosure relates to the technical field of network communication, and in particular, to a method and a receiving device for clock frequency synchronization.

BACKGROUND

At present, the same type of crystal oscillator is integrated in the transmitting device and the receiving device respectively. Due to the hardware differences between different crystal oscillators, the clock frequency generated by the crystal oscillator in the transmitting device and the clock frequency generated by the crystal oscillator in the receiving device differs significantly, causing the transmitting device and the receiving device to work on different crystal frequencies. Therefore, it is more likely that the receiving device does not process data in time, and the data stored by the receiving device is lost due to overflow. At the same time, it is forced to use a large-capacity SDRAM to store or cache more data, which makes the data transmission delay longer.

SUMMARY

Based on the above problems of the prior art, the disclosure provides a method and a receiving device for clock frequency synchronization. The receiving device adopts the scheme of storing data through cache, which can reduce the hardware cost; after the clock frequency of the crystal oscillator in the receiving device is adjusted by the receiving device, the absolute value of the difference between the value of the data volume and the first value is less than or equal to the preset threshold, which can make the UDP packet ultra-low latency transmission.

In a first aspect, a method for clock frequency synchronization is provided. The method includes the following.

A UDP packet transmitted from the transmitting device is obtained by a second communication module of a receiving device, and the UDP packet is stored by the receiving device in the cache of the receiving device.

A value of the data volume of the UDP packet in the cache and a first value are performed, by the receiving device, an operation to obtain the absolute value of the difference between the value of the data volume and the first value.

The receiving device compares the absolute value with the preset threshold. When the absolute value is greater than the preset threshold, a clock frequency of the crystal oscillator in the receiving device is adjusted to obtain a target clock frequency, wherein after the clock frequency of the crystal oscillator in the receiving device is adjusted, the absolute value of the difference between the value of the data volume and the first value is less than or equal to the preset threshold. The crystal oscillator includes a crystal oscillator with a programming interface. The receiving device maintains clock frequency synchronization between the receiving device and the transmitting device based on the target clock frequency.

In a second aspect, a receiving device is provided. The device comprises an obtaining unit, a storage unit, an operation unit, a comparison unit, an adjustment unit, and a synchronization unit.

The obtaining unit is configured to obtain the user datagram protocol (UDP) packet.

The storage unit is configured to store the UDP packet in the cache of the receiving device.

The operation unit is configured to process the value of the data volume of the UDP packet in the cache and a first value to obtain the absolute value of the difference between the value of the data volume and the first value.

The comparison unit is configured to compare the absolute value with the preset threshold.

The adjustment unit is configured to adjust the clock frequency of the crystal oscillator in the receiving device to obtain the target clock frequency, when the absolute value is greater than the preset threshold, wherein after the clock frequency of the crystal oscillator in the receiving device is adjusted, the absolute value of the difference between the value of the data volume and the first value is less than or equal to the preset threshold, and the crystal oscillator comprises a crystal oscillator with a programming interface.

A synchronization unit is configured to maintain the clock frequency synchronization between the receiving device and the transmitting device based on the target clock frequency.

In a third aspect, a receiving device is provided. The receiving device comprises a memory and a processor coupled to the memory. The memory is configured to store application program instruction, and the processor is configured to invoke e application program instruction to perform the method for clock frequency synchronization described in the first aspect.

The disclosure provides a method and a receiving device for clock frequency synchronization. In the present disclosure, the receiving device adopts the scheme of storing data through a cache, which can reduce the hardware cost. The receiving device adjusts the clock frequency so that the absolute value of the difference between the value of the data volume of the UDP packet in the cache and the first value is less than or equal to the preset threshold, realizing ultra-low latency transmission of the UDP packet, i.e., realizing high quality and low latency transmission of high-definition (HD) video.

BRIEF DESCRIPTION OF THE DRAWINGS

In order to explain the technical solutions in implementations of the disclosure more clearly, the drawings used in the description of the implementations are briefly introduced below. Obviously, the drawings in the following description are some implementations of the disclosure. For ordinary technicians, other drawings can be obtained based on these drawings without paying creative work.

DETAILED DESCRIPTION

The technical solutions in the disclosure will be described clearly and completely in combination with the accompanying drawings in the disclosure. Obviously, the described implementations are part of the implementations of the disclosure, but not all of the implementations.

Figure 1:
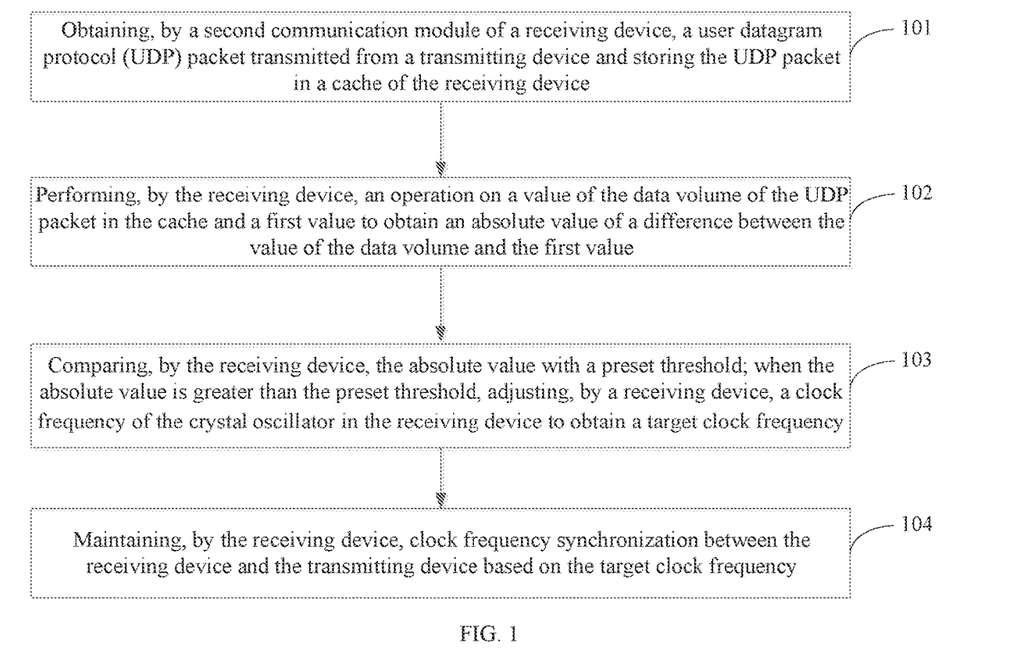
FIG. 1 is a schematic flowchart of a method for clock frequency synchronization according to the disclosure.

FIG. 1 is a schematic flowchart of the method for clock frequency synchronization according to the disclosure. As shown in FIG. 1, the method may include, but is not limited to, the following.

At block 101, the receiving device obtains the UDP packet transmitted from the transmitting device by a second communication module, and stores the UDP packet in the cache of the receiving device.

According to an embodiment of the disclosure, before the receiving device obtains the user datagram protocol (UDP) packet transmitted from the transmitting device by the second communication module, the transmitting device may be configured to process multimedia data to obtain the UDP packet, which may include, but is not limited to, the following processing methods.

Processing Method 1

The transmitting device may be configured to encapsulate the multimedia data obtained into the UDP packet through the UDP.

Processing Method 2

The transmitting device can be configured to encode the multimedia data obtained into code stream data, and then encapsulate the code stream data into the UDP packet through the UDP. Specifically, the multimedia data obtained is encoded through display stream compression (DSC) algorithm to obtain code stream data, and the code stream data is encapsulated into the UDP packet through the UDP.

The multimedia data obtained is encoded with JPEG2000 compression algorithm to obtain code stream data, and the code stream data is encapsulated into the UDP packet through the UDP.

When a format of multimedia data is a RGB format, the multimedia data with the RGB format is converted into the multimedia data with a YUV444 format through color space convert (CSC) algorithm, and the multimedia data with YUV444 format is sampled to obtain a first data with YUV format; the first data is compressed through DSC algorithm to obtain the code stream data, and the code stream data is encapsulated into the UDP packet through the UDP.

When the format of the multimedia data is RGB format, the multimedia data with the RGB format is converted into multimedia data of YUV444 format through CSC algorithm, and the multimedia data of the YUV444 format is sampled to obtain data of YUV420 format (where the amount of data is compressed with 2 times); the data of the YUV420 format is processed (no compression algorithm is used to compress the data of the YUV420 format) into code stream data, and the code stream data is encapsulated into the UDP packet through the UDP.

When the format of multimedia data is RGB format, the multimedia data of RGB format is converted into multimedia data of YUV444 format with CSC algorithm, and the multimedia data of YUV444 format is sampled to obtain the first data of YUV format; the first data is compressed with JPEG2000 compression algorithm to obtain the code stream data, and the code stream data is encapsulated into the UDP packet through the UDP.

The receiving device obtains, by the second communication module, the UDP packet transmitted from the transmitting device, which may include, but is not limited to, the following methods.

Method 1

The receiving device receives, by the second communication module, the UDP packet transmitted from the transmitting device.

Method 2

The receiving device receives, by the second communication module, the UDP packet forwarded by the switch, after the switch receives the UDP packet transmitted from the transmitting device.

It should be noted that the UDP packet is stored, by the receiving device, in the cache of the receiving device may include the following.

The UDP packet is stored by the receiving device in the cache of the receiving device for data exchange.

The cache of the receiving device may include, but is not limited to, a primary cache, a secondary cache, a tertiary cache, a super cache, or a system cache.

At block 102, the receiving device operates the value of the data volume of the UDP packet in the cache with the first value to obtain the absolute value of the difference between the value of the data volume and the first value.

According to an embodiment of the disclosure, the first value may be half of the storage capacity of the above-mentioned cache.

For example, when the storage capacity of the cache is 16K, the first value can be 8K.

At block 103, the receiving device compares the absolute value with the preset threshold, and if the absolute value is greater than the preset threshold, the receiving device adjusts a clock frequency of the crystal oscillator in the receiving device to obtain a target clock frequency, where after the clock frequency of the crystal oscillator in the receiving device is adjusted, the absolute value of the difference between the value of the data amount and the first value is less than or equal to the preset threshold.

It should be noted that the crystal oscillator in the receiving device can include a crystal oscillator with integrated I2C bus interface, a crystal oscillator with integrated serial peripheral interface (SPI) and other variable frequency crystal oscillators with programming interface, voltage-controlled crystal oscillator (e.g., VCXO crystal oscillator) or temperature-controlled crystal oscillator and other variable frequency crystal oscillators.

According to an embodiment of the disclosure, if the absolute value is greater than the preset threshold, the receiving device adjusts the clock frequency of the crystal oscillator in the receiving device to obtain the target clock frequency, which may include, but is not limited to, the following methods.

Method 1

If the value of the data volume of the UDP packet is greater than the first value, and the absolute value of the difference between the value of the data volume and the first value is greater than the preset threshold, the receiving device adjusts the clock frequency of the crystal oscillator in the receiving device to obtain the target clock frequency.

Method 2

If the value of the data volume of the UDP packet is less than or equal to the first value, and the absolute value of the difference between the value of the data volume and the first value is greater than the preset threshold, the receiving device adjusts the clock frequency of the crystal oscillator in the receiving device to obtain the target clock frequency.

Preferably, the preset threshold may be 0 or 0.1K.

Where the receiving device processes the UDP packet based on the clock frequency of the crystal oscillator in the receiving device to obtain multimedia data.

It should be explained that the following is an example of a crystal oscillator being a programmable crystal oscillator in the receiving device, and the receiving device adjusts the clock frequency of the crystal oscillator in the receiving device to obtain a target clock frequency. Specifically, the receiving device adjusts the clock frequency of the crystal oscillator in the receiving device to obtain the target clock frequency, which may include, but is not limited to, the following methods.

The receiving device adjusts the clock frequency of the crystal oscillator in the receiving device through proportion integral differential (PID) algorithm to obtain the target clock frequency, which may include, but is not limited to, the following methods.

Method 1

The receiving device adjusts the crystal oscillator in the receiving device through the PID algorithm to increase the clock frequency of the crystal oscillator in the receiving device to obtain the target clock frequency.

Method 2

The receiving device adjusts the crystal oscillator in the receiving device through the PID algorithm to reduce the clock frequency of the crystal in the receiving device to obtain the target clock frequency.

The following is a brief description of the principle of the PID algorithm.

Figure 2:
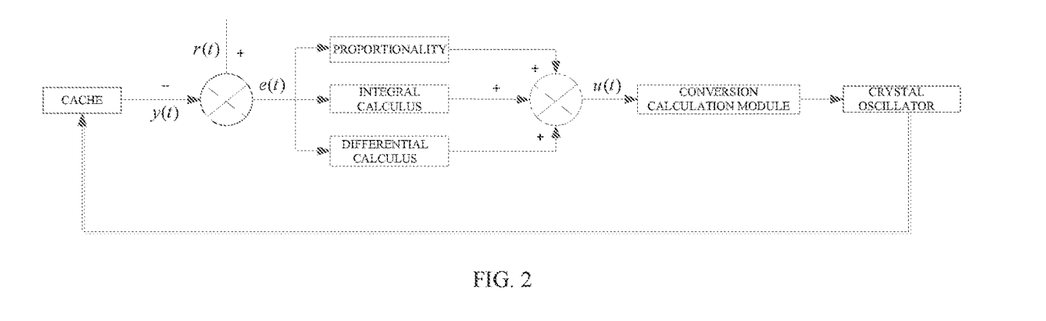
FIG. 2 is a schematic block diagram of one of a PID algorithm according to the disclosure.

FIG. 2 is a schematic block diagram of PID algorithm. As shown in FIG. 2, the block diagram may include a crystal oscillator, and a controller for controlling the crystal oscillator. Where, r(t) may be a first value, and y(t) may be the value of the data volume in the UDP packet in the cache of the receiving device.

The static deviation e(t) in the control process between the value of the data volume of the UDP packet in the cache of the receiving device and the first value equals r(t)-y(t) where, e(t) is the input to the controller in the PID algorithm, u(t) is the output of the controller and the input of the crystal oscillator in the PLD algorithm.

It should be noted that the control law of the controller in the above PID algorithm can be:

$$u(t) = K_p \left[ e(t) + \frac{1}{T_i} \int_0^t e(t)dt + T_d \frac{de(t)}{dt} \right]$$

Where $K_p$ denotes the scale factor of the controller, $T_i$ denotes the integration factor (integration time) of the controller, and $T_d$ denotes the differentiation factor (differentiation time) of the controller.

It should be noted that there is a mapping relationship between u(t) and the clock frequency step (Hz), i.e., the receiving device can calculate and determine the size of a clock frequency step based on the value of u(t) obtained by the internal integrated conversion calculation module, and then, according to the clock frequency step, the crystal oscillator in the receiving device can be adjusted to achieve the adjustment of the clock frequency of the crystal oscillator (e.g., after adjusting the crystal oscillator in the receiving device, the clock frequency of the crystal oscillator in the receiving device can be increased).

It should be noted that TABLE 1 exemplarily illustrates the mapping relationship between the u(t) and the clock frequency step.

As shown in TABLE 1, there is a one-to-one correspondence between u(t) and the clock frequency step.

When the u(t) is A, the clock frequency step is a, that is, when the u(t) is A, the receiving device adjusts the crystal oscillator in the receiving device based on the clock frequency step with a, so that the crystal oscillator adjusted in the receiving device clock frequency can be (A+a).

Where the clock frequency step is a real number, i.e., a, b, c, d, e, f, and g are real number.

TABLE 1

| u(t) | A | B | C | D | E | F | G |
|---|---|---|---|---|---|---|---|
| Clock frequency step (Hz) | a | b | c | d | e | f | g |

It should be noted that the proportional link is used to react instantaneously to the static deviation e(t). Specifically, if the static deviation e(t) occurs, the controller immediately generates a control effect, which makes the control quantity change in the direction of reducing the static deviation e(t), and the strength of the control effect depends on the proportional coefficient $K_p$. The larger the proportional coefficient $K_p$, the stronger the control effect, the faster the transition process, and the smaller the static deviation e(t) of the control process. But the larger the proportional coefficient $K_p$, the more likely it is to generate oscillation and destroy the system stability of the PID algorithm. Therefore, the proportional coefficient $K_p$ must be chosen appropriately in order to make the transition time less and achieve a small and stable effect of static deviation e(t).

It should be noted that an integral link will eliminate the error, but it will also reduce the response speed of the PID algorithm. The larger the integration factor $T_i$, the lower the role of integration accumulation, and thus the PID algorithm will not oscillate during the transition process. But if the integration factor $T_i$ is increased, it will slow down the elimination process of error elimination, and the time required to eliminate the static deviation e(t) will be longer. When the integration factor $T_i$ is small, the integral accumulation effect is larger, so the PID algorithm may oscillate during the transition process, but the time required to eliminate the static deviation e(t) is shorter.

In the PID algorithm, in addition to the desire to eliminate error, it is also necessary to speed up the regulation process. At the moment of a static deviation e(t), or at a changing moment of the static deviation e(t), it is necessary not only to respond immediately to the amount of deviation, but also to give an appropriate correction in advance according to the trend of the static deviation e(t). In order to achieve this, a differential link can be added to the controller of the PID algorithm.

The function of the differential link is to stop the change of the static deviation e(t), which is controlled according to the trend (speed of change) of the static deviation e(t). The faster the static deviation e(t) changes, the larger the output of the differential link is, and it corrects the static deviation e(t) before it becomes larger. The introduction of the differential link helps to overcome oscillation and improve the system stability of the PID algorithm.

It should be noted that the receiving device is connected to a display device.

The method further includes the following step, after the receiving device adjusts the clock frequency of the crystal oscillator in the receiving device to obtain the target clock frequency.

The receiving device processes the UDP packet in the cache based on the target clock frequency to obtain multimedia data, where the display device is used to display or play the multimedia data.

Specifically, the receiving device processes the UDP packets in the cache based on the target clock frequency to obtain multimedia data, which may include, but is not limited to, the following steps.

Step 1: the receiving device decapsulates the UDP packet in the cache based on the target clock frequency and in conjunction with the UDP to obtain code stream data.

Step 2: the receiving device decompresses the code stream data to obtain the multimedia data, which may specifically include, but is not limited to, the following methods.

Method 1

The receiving device can decompress the code stream data through a DSC decompression algorithm to obtain the multimedia data. Or, The receiving device can decompress the code stream data through a JPEG2000 decompression algorithm to obtain the multimedia data. Or, when the format of multimedia data is RGB format, the receiving device decompresses the code stream data through DSC decompression algorithm to obtain the first data of YUV format, interpolates the first data to obtain multimedia data of YUV444 format, and convert multimedia data of YUV444 format to multimedia data of RGB format through CSC algorithm. Or, when the format of multimedia data is RGB format, the code stream data is processed (the decompression algorithm is not adopted to decompress the code stream data) to obtain data of YUV420 format by the receiving device, and the data of YUV420 format is interpolated to obtain multimedia data of YUV444 format by the receiving device, and the multimedia data of YUV444 format is converted, by the receiving device, into multimedia data of RGB format through CSC algorithm. Or, when the format of multimedia data is RGB format, the deceiving device decompress, through the JPEG2000 decompression algorithm, the code stream data to obtain first data of YUV format, interpolate the first data to obtain multimedia data of YUV444 format, and convert, through CSC algorithm, the multimedia data of YUV444 format into multimedia data of RGB format.

It should be noted that the receiving device processes the UDP packet in the cache based on the target clock frequency to obtain multimedia data, which may further include the following steps.

The receiving device decapsulates the UDP packet in the cache to obtain multimedia data based on the target clock frequency and in conjunction with the UDP.

At block 104, the receiving device maintains, based on the target clock frequency, clock frequency synchronization between the receiving device and the transmitting device.

Specifically, the receiving device synchronizes, based on the target clock frequency, the UDP packet transmitted, according to the preset clock frequency, from the transmitting device (e.g., decompression or decapsulation operation) to keep the clock frequency synchronized between the receiving device and the transmitting device.

In summary, the disclosure provides a method for clock frequency synchronization. The receiving device obtains a UDP packet transmitted from the transmitting device, stores the UDP packet in a cache of the receiving device, perform an operation on a value of the data volume of the UDP packet in the cache and the first value to obtain an absolute value of the difference between the value of the data volume and the first value, and compares the absolute value with a preset threshold. When the absolute value is greater than the preset threshold, the clock frequency of the crystal oscillator in the receiving device is adjusted to obtain the target clock frequency. Where the clock frequency of the crystal oscillator in the receiving device is adjusted, the absolute value of the difference between the value of the data volume and the first value is less than or equal to the preset threshold, and the receiving device maintains clock frequency synchronization between the receiving device and the transmitting device based on the target clock frequency. By adopting the scheme of storing data in cache, the hardware cost can be reduced; it enables ultra-low latency transmission of the UDP packet, i.e., high quality and low latency transmission of HD video is achieved.

Figure 3:
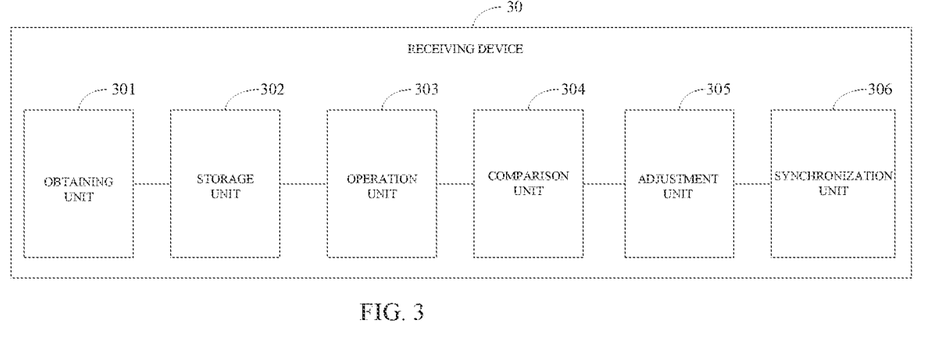
FIG. 3 is a schematic block diagram of a receiving device according to the disclosure.

FIG. 3 is a schematic structural block diagram of the receiving device according to the present disclosure. As shown in FIG. 3, the receiving device 30 may include, but is not limited to, an obtaining unit 301, a storage unit 302, an operation unit 303, a comparison unit 304, an adjustment unit 305, and a synchronization unit 306.

The obtaining unit 301 may be configured to obtain the UDP packet transmitted by the transmitting device.

The storage unit 302 may be configured to store the UDP packet in the cache of the receiving device 30.

The operation unit 303 may be configured to process the value of the data volume of the UDP packet in the cache with the first value to obtain the absolute value of the difference between the value of the data volume and the first value.

The comparison unit 304 is configured to compare the absolute value with a preset threshold.

The adjustment unit 305 may be configured to adjust the clock frequency of the crystal oscillator in the receiving device to obtain a target clock frequency, when the absolute value is greater than the preset threshold, so that after the clock frequency of the crystal oscillator in the receiving device is adjusted, the absolute value of the difference between the value of the data volume and the first value is less than or equal to the preset threshold, where the crystal oscillator includes a crystal oscillator with a programming interface.

The synchronization unit 306 may be configured to maintain clock frequency synchronization between the receiving device and the transmitting device based on the target clock frequency.

The obtaining unit 301 configured to obtain the UDP packet transmitted from the transmitting device is configured to:

receive, the UDP packet transmitted from the transmitting device; or, receive the UDP packet forwarded by a switch, after the switch receives the UDP packet transmitted from the transmitting device.

The adjustment unit 305 configured to adjust the clock frequency of the crystal oscillator in the receiving device to obtain the target clock frequency is configured to:

adjust the clock frequency of the crystal oscillator in the receiving device 30 to obtain the target clock frequency, when the value of the data volume is greater than the first value, and the absolute value of the difference between the value of the amount of data and the first value is greater than the preset threshold; or, adjust the clock frequency of the crystal oscillator in the receiving device 30 to obtain the target clock frequency, when the value of the data volume is less than or equal to the first value and the absolute value of the difference between the value of the data volume and the first value is greater than the preset threshold.

More specifically, the adjustment unit 305 may be configured to adjust the clock frequency of the crystal oscillator in the receiving device 30 through a proportion integral differential (PID) algorithm to obtain a target clock frequency. For example, the adjustment unit 305 may be configured to increase, through the PID algorithm, a clock frequency of the crystal oscillator in the receiving device 30 to obtain a target clock frequency, where the target clock frequency is greater than the clock frequency.

The receiving device 30 may include, but is not limited to, an obtaining unit 301, a storage unit 302, an operation unit 303, a comparison unit 304, an adjustment unit 305, and a synchronization unit 306. The receiving device 30 may further include a processing unit.

The processing unit can be configured to:

process the UDP packet in the cache based on the target clock frequency to obtain multimedia data, after the clock frequency of the crystal oscillator in the receiving device 30 has been adjusted by the adjustment unit 305 described above to obtain the target clock frequency, and a display device is used to display or play the multimedia data, when the receiving unit 30 connected to the display device.

It should be noted that the processing unit configured to process the UDP packet in the cache based on the target clock frequency to obtain multimedia data is configured to:

decapsulate the UDP packet in the cache based on the target clock frequency to obtain protocol data stream and decompress the protocol data stream to obtain multimedia data.

The processing unit configured to process the UDP packet in the cache based on the target clock frequency to obtain multimedia data is configured to:

decapsulate the UDP packet in the cache based on the target clock frequency to obtain the multimedia data.

It should be understood that the receiving device 30 is only one example provided in an embodiment of the disclosure, and the receiving device 30 may have more or fewer components than those shown, may combine two or more components, or may be implemented with different configurations of components.

Figure 4:
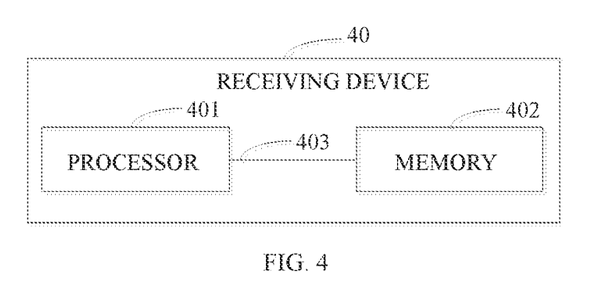
FIG. 4 is another schematic block diagram of the receiving device according to the disclosure.

FIG. 4 is a schematic structural diagram of the receiving device according to the disclosure. As shown in FIG. 4, the receiving device 40 may include, but is not limited to, one or more processors 401, memory 402 (one or more computer readable storage media). These components may communicate on one or more communication buses 403.

The memory 402 is coupled to the processor 401 and may be configured to store various software programs and/or multiple sets of instructions. In specific implementations, the memory 402 may include high-speed random-access memory, and may further include non-volatile memory, such as one or more disk storage devices, flash memory devices, or other non-volatile solid state storage devices. The memory 402 may store an operating system (hereinafter referred to as a system), for example, an embedded operating system such as ANDROID, IOS, WINDOWS, or LINUX. The memory 402 may further store a network communication program that may be used to communicate with one or more additional devices, one or more terminal devices, one or more network devices. The memory 402 can further store a user interface program that can display the content of the application in a graphical interface and receive user control operation of the application via input controls such as menus, dialog boxes, and keys.

It should be understood that the memory 402 may be configured to store the UDP packet transmitted from the transmitting device by the second communication module.

It is understood that the processor 401 may be configured to obtain the UDP packet transmitted from the transmitting device by the second communication module and store the UDP packet in the memory 402.

The processor 401 may be configured to perform an operation on the value of the data volume of the UDP packet in the memory 402 with the first value to obtain the absolute value of the difference between the value of the data volume and the first value.

The processor 401 may be configured to compare the absolute value with a preset threshold, when the absolute value is greater than the preset threshold.

The processor 401 may be configured to adjust the clock frequency of the crystal oscillator in the receiving device 40 to obtain a target clock frequency, where after the clock frequency of the crystal oscillator in the receiving device is adjusted, the absolute value of the difference between the value of the data volume and the first value is less than or equal to the preset threshold.

The processor 401 may be configured to maintain clock frequency synchronization between the receiving device and the transmitting device based on the target clock frequency.

The processor 401 can specifically further configured to:

adjust the clock frequency of the crystal oscillator in the receiving device 40 to obtain a target clock frequency, when the absolute value is greater than the preset threshold.

More specifically, the processor 401 configured to adjust the clock frequency of the crystal oscillator in the receiving device 40 to obtain a target clock frequency is configured to:

adjust, through the PID algorithm, the clock frequency of the crystal oscillator in the receiving device 40 to obtain a target clock frequency. For example, the processor 401 is configured to increase the clock frequency of the crystal oscillator in the receiving device 40 through the PID algorithm to obtain a target clock frequency, where the target clock frequency is greater than the clock frequency. Or, if the absolute value is greater than the preset threshold, the processor 401 is configured to adjust the clock frequency of the crystal oscillator in the receiving device 40 to obtain the target clock frequency.

When the receiving device 40 connected to the display device;

after the processor 401 is configured to adjust the clock frequency of the crystal oscillator in the receiving device 40 to obtain the target clock frequency, the processor 401 is further configured to process the UDP packet in the cache based on the target clock frequency to obtain multimedia data, and the display device is configured to display or play the multimedia data.

The processor 401 configured to process the UDP packet in the cache based on the target clock frequency to obtain multimedia data is configured to:

decapsulate the UDP packet in the cache based on the target clock frequency to obtain protocol data stream, and decompress the protocol data stream to obtain the multimedia data. Or, the processor 401 configured to process the UDP packet in the cache based on the target clock frequency to obtain multimedia data is configured to:

decapsulate the UDP packet in the cache based on the target clock frequency to obtain the multimedia data.

It should be understood that receiving device 40 is only one example provided by the embodiment of the disclosure, and that receiving device 40 may have more or fewer components than illustrated, may combine two or more components, or may have different configurations of components implemented.

Those ordinary skilled in the art may realize that the modules and algorithm steps of each example described in combination with the implementations of the disclosure can be performed by electronic hardware, computer software, or a combination thereof. In order to clearly explain the interchangeability of hardware and software, the composition and steps of each example have been described generally in terms of functions in the above description. Whether these functions are performed in hardware or software depends on the specific application and design constraints of the technical solution. Professional technicians can use different methods to implement the described functions for each specific application, but such implementation should not be considered to be beyond the scope of the disclosure.

Those skilled in the art can clearly understand that, for the convenience and brevity of the description, the specific working processes of the devices and modules described above can refer to the corresponding processes in the foregoing implementations of method, and are not repeated here.

In the several implementations provided in the disclosure, it should be understood that the disclosed equipment, device, and method may be implemented in other ways. For example, to describe the composition and steps of each example. Whether these functions are executed in hardware or software depends on the specific application of the technical solution and design constraints. Professional technicians can use different methods to implement the described functions for each specific application, but such implementation should not be considered beyond the scope of this disclosure.

The implementations of device and equipment described above are only schematic. For example, the division of the modules is only a logical function division. In actual implementation, there may be another division manner. For example, multiple modules or components may be combined or integrated into another device, or some features can be ignored or not be implemented. In addition, the displayed or discussed mutual coupling or direct coupling or communication connection may be indirect coupling or communication connection via some interfaces, equipment, devices or modules, and may also be electrical, mechanical or other forms of connection.

The modules described as separate components may or may not be physically separated, and the components displayed as modules may or may not be physical modules, may be located in one place, or may be distributed on multiple network modules. Some or all of the modules may be selected according to actual needs to achieve the objects of the solutions in the implementations of the disclosure.

In addition, each functional module in each implementation of the disclosure may be integrated into one processing module, or each module may exist separately physically, or two or more modules may be integrated into one module. The above integrated modules may be implemented in the form of hardware or software functional modules.

When the integrated module is implemented in the form of a software functional module and sold or used as an independent product, it can be stored in a computer-readable storage medium. Based on this understanding, the technical solution of the disclosure essentially or a part that contributes to the existing technology, or all or part of the technical solution may be embodied in the form of a software product. The computer software product is stored in a storage medium which includes instructions to enable a computer device (which may be a personal computer, a server, or a network device, etc.) to perform all or part of the steps of the method described in the implementations of the disclosure. The foregoing storage media include: U-disks, mobile hard disks, read-only memory (ROM), random access memory (RAM), magnetic disks, or optical disks and other media that can store program codes.

The above is only a specific implementation of the disclosure, but the scope of protection of the disclosure is not limited to this. Any person skilled in the art can easily think of various equivalent modifications or replacements within the technical scope disclosed in the disclosure which should be covered by the protection scope of the disclosure. Therefore, the protection scope of the disclosure shall be subject to the protection scope of the claims.

What is claimed is:

1. A method for clock frequency synchronization, comprising:
    obtaining, by a second communication module of a receiving device, a user datagram protocol (UDP) packet transmitted from a transmitting device;
    storing, by the receiving device, the UDP packet in a cache of the receiving device;
    performing, by the receiving device, an operation on a value of the data volume of the UDP packet in the cache and a first value to obtain an absolute value of a difference between the value of the data volume and the first value;
    comparing, by the receiving device, the absolute value with a preset threshold; when the absolute value is greater than the preset threshold, adjusting, by a receiving device, a clock frequency of the crystal oscillator in the receiving device to obtain a target clock frequency; wherein after the clock frequency of the crystal oscillator in the receiving device is adjusted, the absolute value of the difference between the value of the data volume and the first value is less than or equal to the preset threshold, and the crystal oscillator comprises a crystal oscillator with a programming interface; and
    maintaining, by the receiving device, clock frequency synchronization between the receiving device and the transmitting device based on the target clock frequency, wherein
    when the absolute value is greater than the preset threshold, adjusting, by the receiving device, the clock frequency of the crystal oscillator in the receiving device to obtain the target clock frequency comprises:
    when the value of the data volume is greater than the first value and the absolute value of the difference between the value of the data volume and the first value is greater than the preset threshold, adjusting, by the receiving device, the clock frequency of the crystal oscillator in the receiving device to obtain the target clock frequency; or,
    when the value of the data volume is less than or equal to the first value and the absolute value of the difference between the value of the data volume and the first value is greater than the preset threshold, adjusting, by the receiving device, the clock frequency of the crystal oscillator in the receiving device to obtain the target clock frequency.

2. The method for clock frequency synchronization according to claim 1, wherein obtaining, by the second communication module of the receiving device, the UDP packet transmitted from the transmitting device comprises:
    receiving, by the second communication module of the receiving device, the UDP packet transmitting by the transmitting device; or, receiving, by the second communication module of the receiving device, the UDP packet forwarded by a switch, after the switch receives the UDP packet transmitted by the transmitting device.

3. The method for clock frequency synchronization according to claim 1, wherein
maintaining, by the receiving device, clock frequency synchronization between the receiving device and the transmitting device based on the target clock frequency comprises:
processing, by the receiving device based on the target clock frequency, the UDP packet transmitted from the transmitting device based on a preset target clock frequency to maintain clock frequency synchronization between the receiving device and the transmitting device.

4. The method for clock frequency synchronization according to claim 1, wherein
adjusting, by the receiving device, the clock frequency of the crystal oscillator in the receiving device to obtain the target clock frequency comprises:
adjusting, by receiving device, the clock frequency of the crystal oscillator in the receiving device through a proportion integral differential (PID) algorithm to obtain the target clock frequency.

5. The method for clock frequency synchronization according to claim 4, wherein
adjusting, by the receiving device, the clock frequency of the crystal oscillator in the receiving device through the PID algorithm to obtain the target clock frequency comprises:
adjusting, by the receiving device, the crystal oscillator in the receiving device through the PID algorithm to increase the clock frequency of the crystal oscillator in the receiving device and obtain the target clock frequency.

6. The method for clock frequency synchronization according to claim 1, wherein
the receiving device is connected to a display device; and the method further comprises:
after adjusting, by the receiving device, the clock frequency of the crystal oscillator in the receiving device to obtain the target clock frequency, processing, by the receiving device, the UDP packet in the cache based on the target clock frequency to obtain multimedia data; wherein the display device is configured to display or play the multimedia data.

7. The method for clock frequency synchronization according to claim 6, wherein
processing, by the receiving device, the UDP packet in the cache based on the target clock frequency to obtain the multimedia data comprises:
decapsulating, by the receiving device, the UDP packet in the cache based on the target clock frequency to obtain code stream data; and
decompressing, by the receiving device, the code stream data to obtain the multimedia data.

8. The method for clock frequency synchronization according to claim 6, wherein
processing, by the receiving device, the UDP packet in the cache based on the target clock frequency to obtain the multimedia data comprises:
decapsulating, by the receiving device, the UDP packet in the cache based on the target clock frequency to obtain the multimedia data.

9. A receiving device, comprising:
a memory configured to store application program instruction; and
a processor coupled to the memory and configured to invoke the application program instruction to:
obtain a user datagram protocol (UDP) packet transmitted from a transmitting device;
store the UDP packet in a cache of the receiving device;
perform an operation on a value of a data volume of the UDP packet in the cache with a first value to obtain an absolute value of a difference between the value of the data volume and the first value;
compare the absolute value with a preset threshold; when the absolute value is greater than the preset threshold, adjust the clock frequency of a crystal oscillator in the receiving device to obtain a target clock frequency, wherein an adjusted absolute value of the difference is less than or equal to the preset threshold; and the crystal oscillator comprises a crystal oscillator with a programming interface; and
maintain, based on the target clock frequency, clock frequency synchronization between the receiving device and the transmitting device, wherein
the processor configured to adjust the clock frequency of the crystal oscillator in the receiving device to obtain the target clock frequency is configured to:
adjust the clock frequency of the crystal oscillator in the receiving device through a proportion integral differential (PID) algorithm to obtain the target clock frequency.

10. The receiving device according to claim 9, wherein,
the processor configured to adjust the clock frequency of the crystal oscillator in the receiving device through the PID algorithm to obtain the target clock frequency is configured to:
adjust the crystal oscillator in the receiving device through the PID algorithm to increase the clock frequency of the crystal oscillator in the receiving device and obtain the target clock frequency.

11. The receiving device according to claim 9, wherein
the processor configured to adjust a clock frequency of the crystal oscillator in the receiving device to obtain a target clock frequency when the absolute value is greater than the preset threshold is configured to:
adjust the clock frequency of the crystal oscillator in the receiving device to obtain the target clock frequency, when the value of the data volume is greater than the first value and the absolute value of the difference between the value of the data volume and the first value is greater than the preset threshold; or,
adjust the clock frequency of the crystal oscillator in the receiving device to obtain the target clock frequency, when the value of the data volume is less than or equal to the first value and the absolute value of the difference between the value of the data volume and the first value is greater than the preset threshold.

12. The receiving device according to claim 9, wherein
the receiving device configured to obtain the UDP packet transmitted from a transmitting device is configured to:
receive the UDP packet transmitted from the transmitting device; or
receive the UDP packet forwarded by a switch after the switch has received the UDP packet transmitted from the transmitting device.

13. A receiving device, comprising:
a memory configured to store application program instruction; and
a processor coupled to the memory and configured to invoke the application program instruction to:
obtain a user datagram protocol (UDP) packet transmitted from a transmitting device;
store the UDP packet in a cache of the receiving device;
perform an operation on a value of a data volume of the UDP packet in the cache with a first value to obtain an absolute value of a difference between the value of the data volume and the first value;
compare the absolute value with a preset threshold; when the absolute value is greater than the preset threshold, adjust the clock frequency of a crystal oscillator in the receiving device to obtain a target clock frequency, wherein an adjusted absolute value of the difference is less than or equal to the preset threshold; and the crystal oscillator comprises a crystal oscillator with a programming interface; and
maintain, based on the target clock frequency, clock frequency synchronization between the receiving device and the transmitting device, wherein
the processor is further configured to:
process the UDP packet in the cache based on the target clock frequency to obtain multimedia data after adjusting the clock frequency of the crystal oscillator in the receiving device to obtain the target clock frequency; wherein a display device is configured to display or play the multimedia data.

14. The receiving device according to claim 9, wherein the processor configured to maintain clock frequency synchronization between the receiving device and the transmitting device based on the target clock frequency is configured to:
process, based on the target clock frequency, the UDP packet transmitted from the transmitting device based on a preset target clock frequency to maintain clock frequency synchronization between the receiving device and the transmitting device.

15. The receiving device according to claim 14, wherein the processor configured to maintain clock frequency synchronization between the receiving device and the transmitting device based on the target clock frequency is configured to:
decapsulate the UDP packet in the cache based on the target clock frequency and with reference to a UDP to obtain code stream data; and
decompress the code stream data to obtain multimedia data and maintain clock frequency synchronization between the receiving device and the transmitting device.

16. The receiving device according to claim 13, wherein the processor configured to process the UDP packet in the cache based on the target clock frequency to obtain multimedia data is configured to:
decapsulate the UDP packet in the cache based on the target clock frequency to obtain the multimedia data.

17. The receiving device according to claim 13, wherein, the processor configured to process the UDP packet in the cache based on the target clock frequency to obtain multimedia data is configured to:
decapsulate the UDP packet in the cache based on the target clock frequency to obtain code stream data; and
decompress the code stream data to obtain the multimedia data.

* * * * *